(12) United States Patent
Maercovich (10) Patent No.: US 8,016,262 B2
(45) Date of Patent: Sep. 13, 2011

(54) MOTORIZED AUTOMATE/MANUAL PUSH BUTTON SYSTEM

(76) Inventor: Jorge Maercovich, Woodland Hills, CA (US)

( * ) Notice: Subject to any disclaimer, the term of this patent is extended or adjusted under 35 U.S.C. 154(b) by 601 days.

(21) Appl. No.: 12/220,231

(22) Filed: Jul. 22, 2008

(65) Prior Publication Data

US 2010/0019182 A1    Jan. 28, 2010

(51) Int. Cl.
*F16K 31/12*    (2006.01)
(52) U.S. Cl. ........................... 251/129.03; 251/40
(58) Field of Classification Search ............ 251/40, 251/129.03
See application file for complete search history.

(56) References Cited

U.S. PATENT DOCUMENTS

| | | | |
|---|---|---|---|
| 5,427,350 A * | 6/1995 | Rinkewich | 251/30.01 |
| 6,349,921 B1 * | 2/2002 | Jahrling | 251/129.04 |
| 6,978,490 B2 * | 12/2005 | Wilson | 4/249 |
| 7,185,876 B2 * | 3/2007 | Jost | 251/129.04 |
| 7,367,541 B2 * | 5/2008 | Muderlak et al. | 251/129.04 |
| 7,543,436 B2 * | 6/2009 | Scott et al. | 56/328.1 |
| 7,857,280 B2 * | 12/2010 | Maercovich et al. | 251/40 |

* cited by examiner

*Primary Examiner* — John K Fristoe, Jr.
(74) *Attorney, Agent, or Firm* — Raymond Y. Chan; David and Raymond Patent Firm (57) ABSTRACT

A driving mechanism, mounting to a flush apparatus, includes an actuation housing coupling with a valve body, a manual actuation unit including a push button and a manual plunger arm transversely extended from the push button towards a pushing platform, and an automated actuation unit including a motorized unit and an automated plunger arm transversely extended towards the pushing platform. When the push button is manually pressed, the pushing platform is pushed by the manual plunger arm to move a diaphragm member at the unsealed position. When the motorized unit is activated in responsive to a presence of a user, the automated plunger arm is driven by the motorized unit to move towards the pushing platform, such that the pushing platform is pushed by the automated plunger arm to move the diaphragm member at the unsealed position.

30 Claims, 10 Drawing Sheets

MOTORIZED AUTOMATE/MANUAL PUSH BUTTON SYSTEM

BACKGROUND OF THE PRESENT INVENTION

1. Field of Invention

The present invention relates to a flush apparatus, and more particularly to a motorized automate/manual push button system, which is adapted for incorporating with the flush apparatus to selectively actuate the flush apparatus automatically by a motorized device in responsive to a presence of a user and manually by an actuation of a push button.

2. Description of Related Arts

A conventional manual flush apparatus for a sanitary system comprises a valve body, a water valve, and a manual operation mechanism. The valve body has a water inlet communicating with a water source, a water outlet for the water flushing out of the valve body, and a manual handle opening communicating with the manual operation mechanism. The water valve comprises a diaphragm member sealing between the water inlet and the water outlet, and a diaphragm shaft downwardly extended from the diaphragm member to move the diaphragm member between a sealed position and an unsealed position.

The manual operation mechanism comprises a driving unit, a retention ring coupled with the valve body at the manual handle opening to hold the driving unit thereat, and a manual handle movably mounted at the retention ring via a ball joint. The driving unit comprises a dish-shaped pushing platform disposed in the retention ring and a plunger pin extended from the pushing platform towards the diaphragm shaft through the manual handle opening. When the manual handle is manually moved through an arc-path from its first position to push the pushing platform, the plunger pin is laterally moved to push a bottom portion of the diaphragm shaft in a tilted manner, thereby unsealing the diaphragm member to let the water flushing out of the water outlet and thus flushing the sanitary system.

The main advantage of the manual flush apparatus is that the manual operation of the manual operation mechanism is accurate and simple. Accordingly, since the pushing platform provides a relatively large pushing surface for the manual handle, the pushing platform can transmit the pushing force at any direction from the manual handle to a lateral pushing force at the plunger pin. In other words, no matter which contacting point at the pushing surface of the pushing platform is hit by the manual handle, the plunger pin will always laterally move to push the diaphragm shaft. Therefore, the user can move the manual handle at any direction for completing the flushing operation of the manual flush apparatus.

For hygiene purposes, an improved flush apparatus provides an automated operation mechanism for flushing the sanitary system in a hand free manner. The automated operation mechanism comprises a solenoid operated pusher for utilizing a latching solenoid to limit power drain on the battery. Accordingly, when an infrared sensor detects the presence of a user of the sanitary system, the solenoid operated pusher is automatically driven to move the diaphragm shaft for flushing the sanitary system. However, the automated operation mechanism has several common drawbacks.

The presence of the user sensed by the infrared sensor will cause the solenoid to move the diaphragm member to the unsealed position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the automated operation mechanism. In other words, the conventional manual operation mechanism is more reliable than the automated operation mechanism. Thus, the maintenance cost of the automated operation mechanism is higher than that of the conventional manual operation mechanism.

In addition, the structural design of the automated operation mechanism is different from that of the manual operation mechanism. In other words, when the flush apparatus is incorporated with the automated operation mechanism, the flush apparatus will lose the mechanical-manual operated feature. Therefore, there is no alternative to flush the sanitary system when the automated operation mechanism has failed to operate.

The solenoid operated pusher is retracted by a spring force. Accordingly, a compression spring is coaxially mounted at the solenoid operated pusher and arranged in such a manner that when the solenoid operated pusher is pushed forward to move the diaphragm shaft, the compressed spring will apply the spring force to push the solenoid operated pusher back to its original position. Accordingly, the spring will gradually generate a weak spring force after a period of continuous use.

In order to install the automated operation mechanism into the conventional flush apparatus, the manual operation mechanism of the flush apparatus must be totally removed, which is a waste of resources in order to incorporate with the automated operation mechanism. In other words, the driving unit, the retention ring, and the manual handle must be disassembled from the flush apparatus in order to install the automated operation mechanism.

Furthermore, the solenoid must be electrically linked to a power source. The solenoid can be electrically linked with an external AC power source that an electric cable must be properly run from the external power source to the solenoid. Alternatively, the solenoid can be powered by a battery that the battery must be frequently replaced before the solenoid is out of battery.

SUMMARY OF THE PRESENT INVENTION

A main object of the present invention is to provide a motorized automate/manual push button system for a flush apparatus, which is a driving mechanism adapted for incorporating with the flush apparatus to selectively actuate the flush apparatus automatically by a motorized device in responsive to a presence of a user and manually by an actuation of a push button.

Another object of the present invention is to provide a driving mechanism, which is adapted for coupling with the conventional flush apparatus by only detaching the manual handle. In other words, the driving mechanism is adapted to maximize the use of the components of the conventional flush apparatus.

Another object of the present invention is to provide a driving mechanism, which is adapted to mount at the retention ring and to actuate the driving unit of the conventional manual operation mechanism. Therefore, the present invention will provide an accurate and simple flush operation as the manual flush apparatus provides.

Another object of the present invention is to provide a driving mechanism, wherein the manual plunger arm is transversely extended from the push button to the pushing platform of the driving unit such that when the push button is pressed, the pushing platform is pushed at its pushing surface to laterally move the plunger pin as it is operated by the manual handle. Likewise, the automated manual plunger arm is moved to push at the pushing platform of the driving unit to laterally move the plunger pin as it is operated by the manual handle. In other words, both manual and automated operations of the driving mechanism provide a simulated manual operation of the conventional manual flush apparatus.

Another object of the present invention is to provide a driving mechanism, wherein the automated plunger arm is automatically driven by a motorized unit in a lateral direction that the automated plunger arm is laterally moved towards the diaphragm shaft and is laterally moved back from the diaphragm shaft. Therefore, no spring force is applied at the automated plunger arm to retract the automated plunger arm back to its original position.

Another object of the present invention is to provide a driving mechanism, wherein the automated plunger arm has a hollow structure that the manual plunger arm is slidably received in the automated plunger. Therefore, the manual and automated plunger arms are correspondingly provided the lateral movement towards the pushing platform.

Another object of the present invention is to provide a driving mechanism, wherein the power source of the motorized unit is automatically re-charged via a charging device every time during the flushing operation of the flush apparatus.

Another object of the present invention is to provide a driving mechanism, wherein the motorized unit is used as a replacement of the solenoid to control a flow of water, so as to enhance the reliable of the operation of the driving mechanism in comparison with the conventional solenoid mechanism. Thus, the motorized unit avoids water damage and to enhance performance and reliability.

Another object of the present invention is to provide a driving mechanism, which does not require to alter the original structural design of the flush apparatus, so as to minimize the manufacturing cost of the flush apparatus incorporating with the driving mechanism.

Another object of the present invention is to provide a driving mechanism, wherein no expensive or complicated structure is required to employ in the present invention in order to achieve the above mentioned objects. Therefore, the present invention successfully provides an economic and efficient solution for not only providing a selection of manual/automated flush operation for the flush apparatus but also providing an accurate and simple flush operation as the manual flush apparatus does.

Accordingly, in order to accomplish the above objects, the present invention provides a flush apparatus, comprising:

a valve body having a water inlet and a water outlet;

a water valve comprising a diaphragm member sealing between the water inlet and the water outlet, and a diaphragm shaft extended from the diaphragm member to move the diaphragm member between a sealed position and an unsealed position; and an operation device comprising a driving unit and a retention ring coupled with the valve body, wherein the driving unit comprises a pushing platform movably disposed in the retention ring and a plunger pin extended from the pushing platform towards the diaphragm shaft.

The flush apparatus further comprises a driving mechanism, which comprises:

an actuation housing having an actuation channel coupling with the retention ring;

a manual actuation unit which comprises a push button movably mounted at the actuation housing and a manual plunger arm transversely extended along the actuation channel from the push button towards the pushing platform, wherein when the push button is manually pressed, the pushing platform is pushed by the manual plunger arm to move the diaphragm member at the unsealed position; and an automated actuation unit which comprises a motorized unit received in the actuation housing and an automated plunger arm transversely extended along the actuation channel, wherein when the motorized unit is activated in responsive to a presence of a user, the automated plunger arm is driven by the motorized unit to move towards the pushing platform, such that the pushing platform is pushed by the automated plunger arm to move the diaphragm member at the unsealed position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
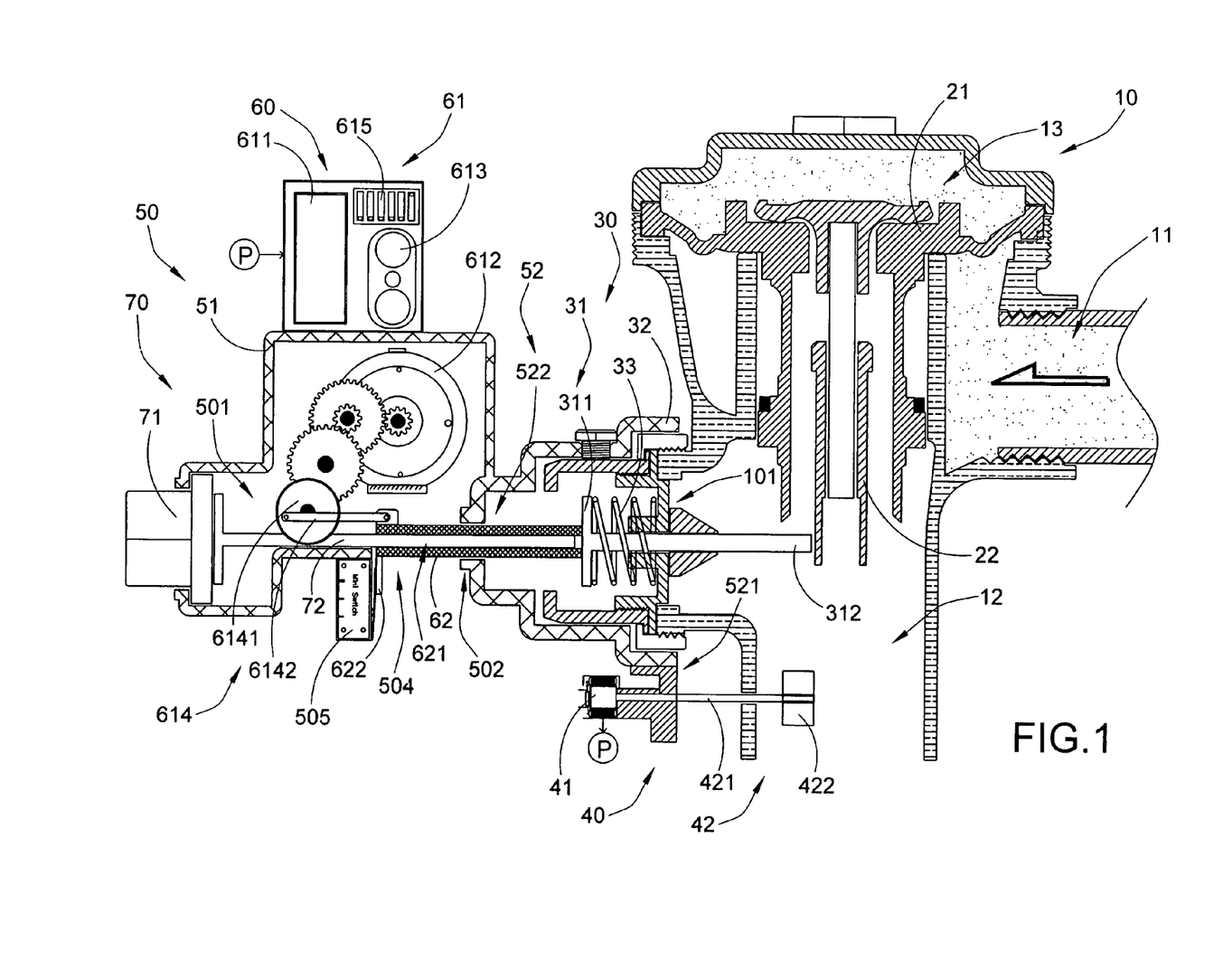
FIG. 1 is a sectional view of a flush apparatus with a driving mechanism according to a first preferred embodiment of the present invention.
Figure 2:
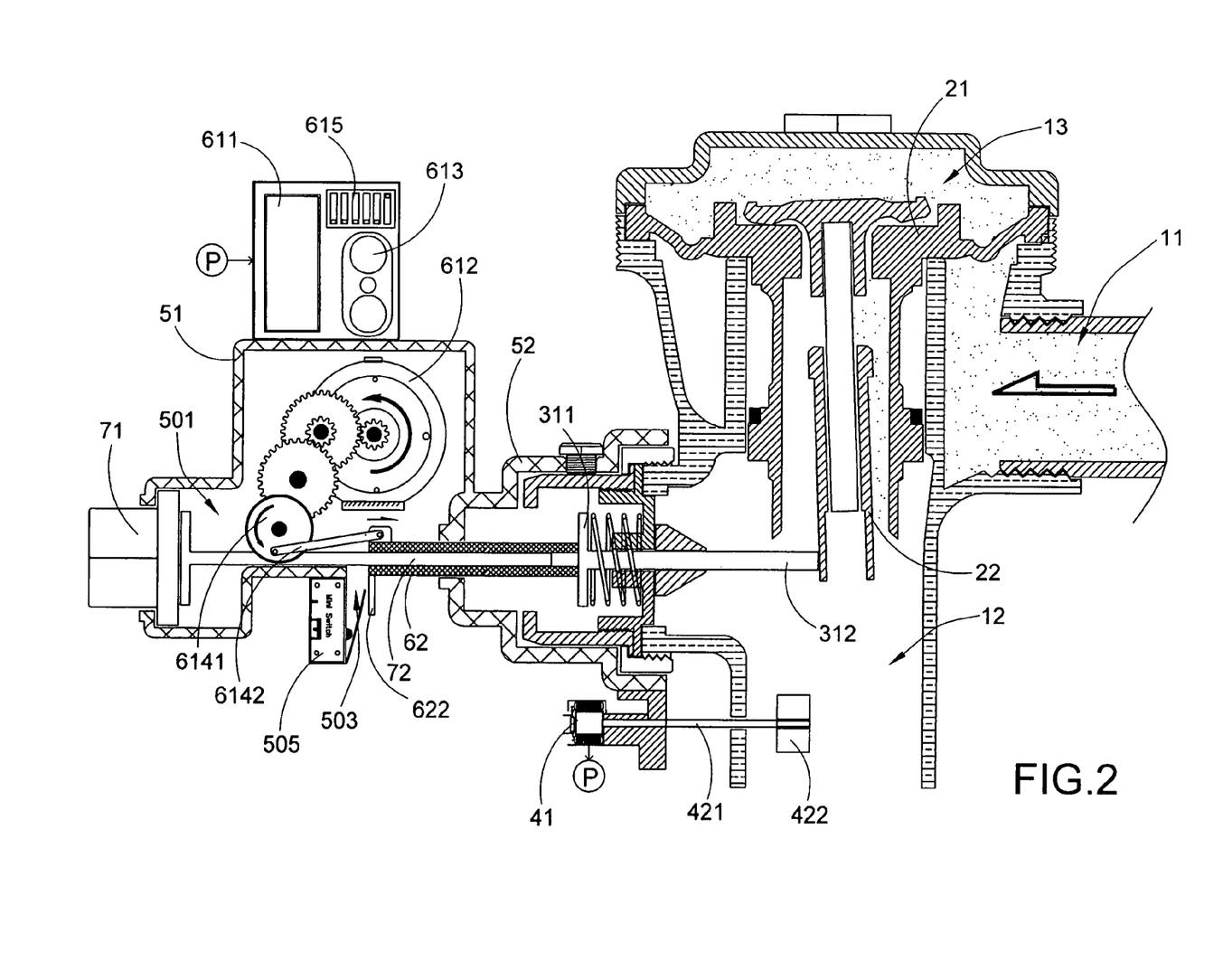
FIG. 2 is a sectional view of the flush apparatus according to the above first preferred embodiment of the present invention, illustrating the automatic plunger arm being actuated.
Figure 3:
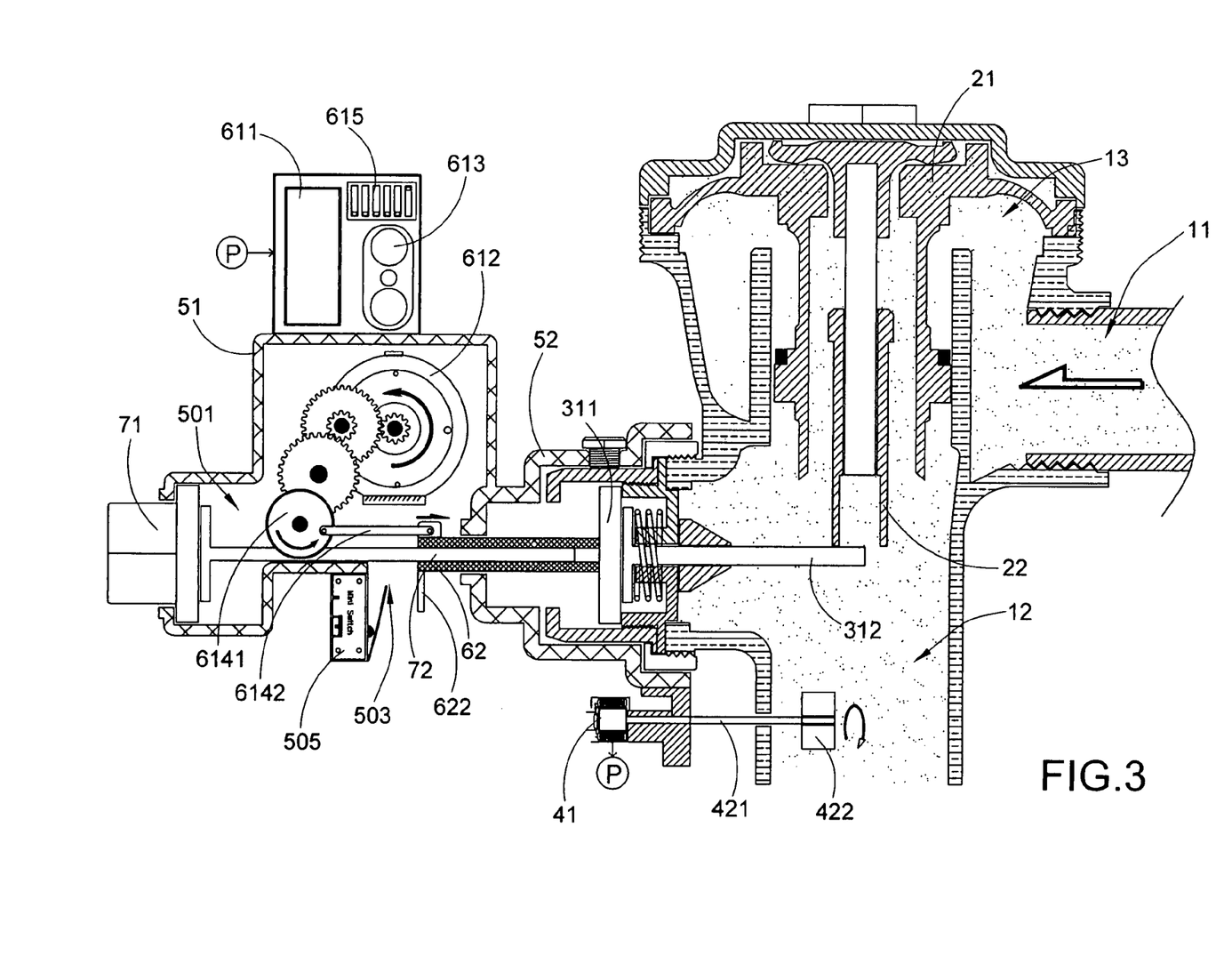
FIG. 3 is a sectional view of the flush apparatus according to the above first preferred embodiment of the present invention, illustrating the diaphragm member returning back to the sealed position.

Referring to FIGS. 1 to 3 of the drawings, a flush apparatus according to a first preferred embodiment of the present invention is illustrated, wherein the flush apparatus, such as a conventional manual flush apparatus for a sanitary system, comprises a valve body 10, a water valve 20 and an operation device 30.

The valve body 10 has a water inlet 11 communicatively linked to a water source, a water outlet 12, and a water chamber 13 provided between the water inlet 11 and the water outlet 13.

The water valve 20 comprises a diaphragm member 21 sealing at the water chamber 13 between the water inlet 11 and the water outlet 12, and a diaphragm shaft 22 extended from the diaphragm member 21 to move the diaphragm member 21 between a sealed position and an unsealed position. Accordingly, at the sealed position, the diaphragm member 21 is sealed at the water chamber 13 via the water pressure inside the valve body 10 to block the water flowing from the water inlet 11 to the water outlet 12. At the unsealed position, the diaphragm member 21 is moved by the diaphragm shaft 22 to allow the water passing from the water inlet 11 to the water outlet 12, thereby flushing the sanitary system.

The operation device 30 comprises a driving unit 31 and a retention ring 32 coupled with the valve body 10 at an operation opening 101 thereof, wherein the driving unit 31 comprises a pushing platform 311 movably disposed in the retention ring 32 and a plunger pin 312 extended from the pushing platform 311 towards the diaphragm shaft 22. Therefore, when the pushing platform 311 is pushed towards the diaphragm shaft 22, the plunger pin 312 is driven to hit a bottom portion of the diaphragm shaft 22 so as to move the diaphragm member 21 from the sealed position to the unsealed position. The operation device 30 further comprises a spring 33 supported in the retention ring 32 for applying an urging force against the pushing platform 311 to push the plunger pin 312 back to its original position after the plunger pin 312 is laterally moved towards the diaphragm shaft 22. It is worth to mention that the pushing platform 311 will only be slid within the retention ring 32 and will be blocked at the surrounding edge of the operation opening 101 of the valve body 10 to prevent the further forward sliding movement of the pushing platform 311. In other words, the pushing platform 311 will not be slid into the valve body 10 through the operation opening 101.

It is worth to mention that when the operation device 30 incorporates with a manual handle as the conventional manual flush apparatus, the manual handle is actuated to push the pushing platform 311 at a pushing surface thereof towards diaphragm shaft 22 so as to move the diaphragm member 21 from the sealed position to the unsealed position.

According to the preferred embodiment, the flush apparatus further comprises a driving mechanism incorporating with the operation device 30, wherein the driving mechanism comprises an actuation housing 50 and an automated actuation unit 60.

The actuation housing 50, having an actuation channel 501, is coupling with the valve body 10. Accordingly, the actuation housing 50 is mounted at the valve body 10 through the retention ring 32 such that the actuation housing 50 is positioned adjacent to the valve body 10. As shown in FIG. 1, the actuation housing 50 comprises a housing body 51 defining the actuation channel 501 at a bottom portion thereof and a tubular mounting ring 52 encirclingly mounting at the retention ring 32 to align the actuation channel 501 with the pushing platform 311.

The automated actuation unit 60 is received in the housing body 51 at a position above the actuation channel 501, wherein the automated actuation unit 60 comprises a motorized unit 61 received in the housing body 51 of the actuation housing 50 and an automated plunger arm 62 transversely extended along the actuation channel 501. Accordingly, the motorized unit 61 is received in the housing body 51 at a position above the actuation channel 501. When the motorized unit 61 is activated in responsive to a presence of a user, the automated plunger arm 62 is driven by the motorized unit 61 to move towards the pushing platform 311, such that the pushing platform 311 is pushed by the automated plunger arm 62 to move the diaphragm member 21 at the unsealed position, as shown in FIG. 2. Accordingly, the diaphragm member 21 is then moved back to its sealed position as shown in FIG. 3.

As shown in FIG. 1, the motorized unit 61 comprises a power source 611, a servo unit 612 electrically coupled with the power source 611, a sensor 613 controllably activating the servo unit 612 in responsive to a presence of the user, and a gear transmission unit 614 coupling the servo unit 612 with the automated plunger arm 62 to transmit a servo power from the servo unit 612 to a transverse force at the automated plunger arm 62 so as to drive the automated plunger arm 62 towards the pushing platform 311.

According to the preferred embodiment, the power source 611 is a rechargeable battery supported in the housing body 51. Alternatively, the power source 611 can be a power outlet electrically linking with an external AC power supply or a solar energy collector for converting solar energy into electrical energy to supply the power to the servo unit 612.

The servo unit 612, according to the preferred embodiment, comprises an electric motor electrically connected to the power source 611, wherein the servo unit 612 is actuated to drive the automated plunger arm 62 to move laterally. It is worth to mention that the electric motor is more reliable than the solenoid because the electric motor provides simple mechanical work rather than using the magnetic force, so as to minimize the failure operation of the servo unit 612 and to reduce the maintenance cost of the present invention. In addition, the size of the electric motor is so small in comparison with the solenoid so as to reduce the overall size of the actuation housing 40 to house the automated actuation unit 60 of the present invention. Therefore, the electric motor is preferred to be used to not only ensure the reliable of the automated actuation unit 60 but also enhance the smooth operation thereof.

The sensor 613, such as an infrared sensor, is arranged to detect the presence of the user by means of infrared signal in such a manner that when the sensor 613 transmits an infrared signal for detecting the presence of the user of the sanitary system, the sensor 613 activates the servo unit 612 to actuate the automated plunger arm 62 to push the pushing platform 311 forward so as to move the diaphragm member 21 at the unsealed position. Accordingly, the housing body 51 has a transparent window aligned with the sensor 613 for allowing the infrared signal sending out through the transparent window. It is worth to mention that the sensor 613 activates the servo unit 612 to stop the automated plunger arm 62 once the operation of the flush apparatus is completed.

Accordingly, a CPU 615 is operatively connected to the sensor 613 to receive the signal therefrom, wherein the servo unit 612 is controlled by the CPU 615 such that once the CPU 615 receives the signal from the sensor 613, the CPU 615 will activate the servo unit 612 to drive the automatic plunger arm 62 for completing the automatic operation. It is worth to mention that the CPU 615 can be programmed to the time period of the presence of the user via the sensor 613 and to control the flush volume of the water via the automated actuation unit 60 by means of the time period of the opening of the diaphragm member 21 at the unsealed position.

The gear transmission unit 614 comprises a gear set 6141 coupling with an output of the servo unit 612 and a driving arm 6142 having one end rotatably coupling with the gear set 6141 and an opposed end pivotally coupling with the automated plunger arm 62 in such a manner that when the servo unit 612 is activated, the automated plunger arm 62 is driven to laterally move in a reciprocating manner.

As shown in FIGS. 2 and 3, the corresponding end of the driving arm 6142 is rotatably coupled with one gear of the gear set 6141, wherein when the corresponding gear is rotated, the automated plunger arm 62 is driven to laterally move in a reciprocating manner. Accordingly, when the corresponding gear is rotated in a half revolution, the automated plunger arm 62 is laterally moved forward to push the pushing platform 311 at a position that the diaphragm member 21 is moved at the unsealed position. When the corresponding gear is rotated in one full revolution, the automated plunger arm 62 is laterally moved backward at a position that the diaphragm member 21 is moved back to the sealed position. Therefore, the automated plunger arm 62 is driven to laterally move in a reciprocating manner via the rotation of the gear set 6141. It is worth to mention that the time of the automated plunger arm 62 traveling back and forth can be controlled by the rotational speed of the gear set 6141. In addition, the automated plunger arm 62 is laterally pulled back by the driving arm 6142 after the pushing platform 311 is pushed forward so as to ensure the automated plunger arm 62 returning back to its original position once the flush operation is completed.

As shown in FIG. 1, the driving mechanism further comprises a manual actuation unit 70 which is received in the housing body 51 of the actuation housing 50. The manual actuation unit 70 comprises a push button 71 movably mounted at the housing body 51 of the actuation housing 50 and a manual plunger arm 72 transversely extended along the actuation channel 501 from the push button 71 towards the pushing platform 311. When the push button 71 is manually pressed, the pushing platform 311 is pushed by the manual plunger arm 72 to move the diaphragm member 21 at the unsealed position.

According to the preferred embodiment, the actuation housing 50 has a button slot provided at a sidewall thereof for the push button 71 slidably mounted at the button slot. The push button 71 is aligned with the pushing platform 311 through the actuation channel 501 such that when the push button 71 is manually pressed, the pushing platform 311 is directly pushed in a lateral direction through the manual plunger arm 72.

As shown in FIG. 1, the manual plunger arm 72 has an enlarged pressing end extended to bias against the push button 71 and an opposed pusher end extended towards the pushing platform 311 through the actuation channel 501 in such a manner that when the push button 71 is manually pressed, the manual plunger arm 72 is directly pushed towards the pushing platform 311.

In order to correspondingly guide the lateral movement between the automated plunger arm 62 and the manual plunger arm 72, the automated plunger arm 62 has a hollow structure defining a sliding channel 621 that the manual plunger arm 72 is slidably extended through the sliding channel 621. Therefore, at the manual flush operation, the automated plunger arm 62 will guide the sliding movement of the manual plunger arm 72 when the automated plunger arm 62 is stationary. Likewise, at the automated flush operation, the manual plunger arm 72 will guide the sliding movement of the automated plunger arm 62 when the manual plunger arm 72 is stationary.

Figure 7:
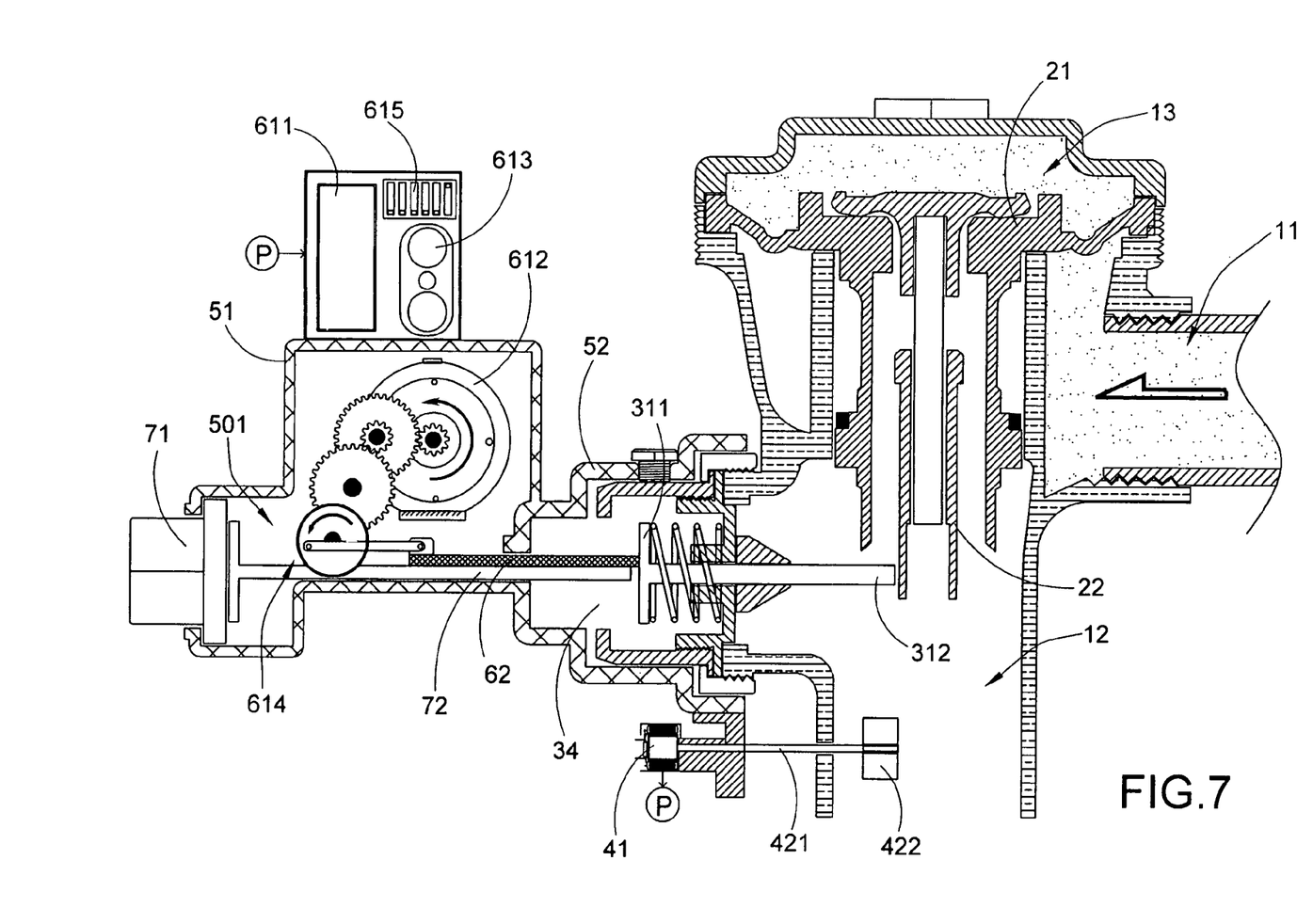
FIG. 7 illustrates an alternative mode of the driving mechanism, illustrating the automatic plunger arm and the manual plunger arm being extended side-by-side.

As shown in FIG. 7, the automated plunger arm 62 and the manual plunger arm 72 can be two individual pins extending side by side to push the pushing platform 311. However, two guiders should be included to guide the sliding movement of each of the automated plunger arm 62 and the manual plunger arm 72.

As shown in FIGS. 1 to 3, the automated plunger arm 62 comprises a sliding stopper 622 protruded outwardly, wherein when the automated plunger arm 62 is laterally moved forward, the sliding stopper 622 is blocked by a first stopper 502 of the housing body 51 so as to stop the further forward movement of the automated plunger arm 62. When the automated plunger arm 62 is laterally moved backward, the sliding stopper 622 is blocked by a second stopper 503 of the housing body 51 so as to ensure the automated plunger arm 62 returning back to its original position. Accordingly, the housing body 51 has a guiding slot 504 provided at a bottom wall of the actuation channel 501, wherein the sliding stopper 622 is downwardly extended from the automated plunger arm 62 to slidably engage with the guiding slot 504. The two ends of the guiding slot 504 form the first and second stoppers 502, 503 respectively, such that the traveling distance of the automated plunger arm 62 is limited by the length of the guiding slot 502 between the two ends thereof.

Accordingly, a contact switch 505 is provided at the housing body 51 at the second stopper 503 and arranged in such a manner that when the sliding stopper 622 is slid along the guiding slot 504 at the second stopper 503, the sliding stopper 622 contacts with the contact switch 505 to generate a stopping signal so as to deactivate the servo unit 612.

As shown in FIG. 1, the mounting ring 52 has an enlarged mounting opening 521 encirclingly mounting at the retention ring 32 and an opposed guiding opening 522 aligning with the actuation channel 501. The automated plunger arm 62 is extended through the guiding opening 522 of the mounting ring 52 to push the pushing platform 311. As it is mentioned above, the manual plunger arm 72 is coaxially coupled with the automated plunger arm 62 such that the automated plunger arm 62 and the manual plunger arm 72 are slidably extended through the guiding opening 522 of the mounting ring 52. In other words, the guiding opening 522 of the mounting ring 52 not only provides a support for the automated plunger arm 62 and the manual plunger arm 72 within the actuation channel 501 but only ensures the correct alignment of the automated plunger arm 62 and the manual plunger arm 72 to push the pushing platform 311.

According to the preferred embodiment, the driving mechanism further comprises a power charging arrangement 40 for charging the power source 611 every time during the flush operation, including both automated flush operation and manual flush operation. The power charging arrangement 40 comprises an electrical generator 41 operatively linked to the power source 611 and a propeller unit 42 extended from the electrical generator 41 to the water outlet 12 of the valve body 10 in such a manner that when the propeller unit 42 is driven to rotate in responsive to a flush of water coming out at the water outlet 12, the electrical generator 41 is actuated to charge the power source 611.

The electrical generator 41, according to the preferred embodiment, is an alternator or a DC generator converting mechanical energy (rotational force) of the propeller unit 42 to the electrical energy. Accordingly, a rectifier can be used to convert AC current to DC current if the alternator is used.

As shown in FIG. 1, the propeller unit 42 comprises a propeller shaft 421 transversely extended with respect to the actuation channel 501 and a propeller blade 422 coupled at a free end of the propeller shaft 421 at the water outlet 12 such that the propeller blade 422 is driven to be rotated in responsive to a flush of water so as to transmit a rotational power to the electrical generator 41 through the propeller shaft 421.

Accordingly, during the flush operation, the diaphragm member 21 is moved at the unsealed position by the diaphragm shaft 22 to allow the water passing from the water inlet 11 to the water outlet 12, thereby flushing the sanitary system. When the water flushes out at the water outlet 12, the flush power of the water will drive the propeller blade 422 to rotate. In other words, the propeller blade 422 provides a torque to the propeller shaft 421 during the water flushing movement at the water outlet 12. The electrical generator 41, which is an induction device, comprises a coil body encircling with a magnet such that when the propeller unit 42 generates the rotational force, the electrical generator 41 will convert the rotational force into an electrical force for charging the power source 611.

The propeller unit 42 translates water flush energy to the rotational torque directly related to the total blade area, i.e. more blades equal more torque. Multiple propeller blades 422 contain a greater surface area on the propeller blades 422 allowing a small diameter propeller size to be effective.

As shown in FIG. 1, the propeller shaft 421 is extended parallel to each of the manual and automated plunger arms 62, 72. Accordingly, the power charging arrangement 40 can be an add-on device externally coupled with the valve body 10. It is worth to mention that the propeller shaft 421, which is made of rigid and durable material, has a relatively small size in diameter. Even though the propeller shaft 421 is extended from the housing body 51 to the water outlet 12 of the valve body 10, the flush operation of the flush apparatus will not be affected. It is appreciated that the power charging arrangement 40 can be an integrated device that the propeller unit 42 is extended through the actuation channel 501 to support the propeller blade 422 at the water outlet 12.

In order to mount the driving mechanism to the valve body 10 which is the conventional manual flush apparatus, the user is able to remove the manual handle from the retention ring 32 only. Then, by mounting the mounting opening 522 of the mounting ring 52 at the retention ring 32, the actuation housing 60 is supported adjacent to the valve body. The installation of the driving mechanism is completed. Therefore, the user is able to selectively operation the flush apparatus manually by pressing the push button 71 or automatically by detecting the presence of the user via the sensor 612. It is worth to mention that both manual and automated flush operation via the driving mechanism of the present invention act like the conventional manual flush operation by pushing the pushing platform 311 to move the diaphragm member 21 at the unsealed position through the diaphragm shaft 22. Therefore, the present invention provides an accurate, reliable, and simple manual/automated flush operation as the manual flush apparatus provides.

Figure 4:
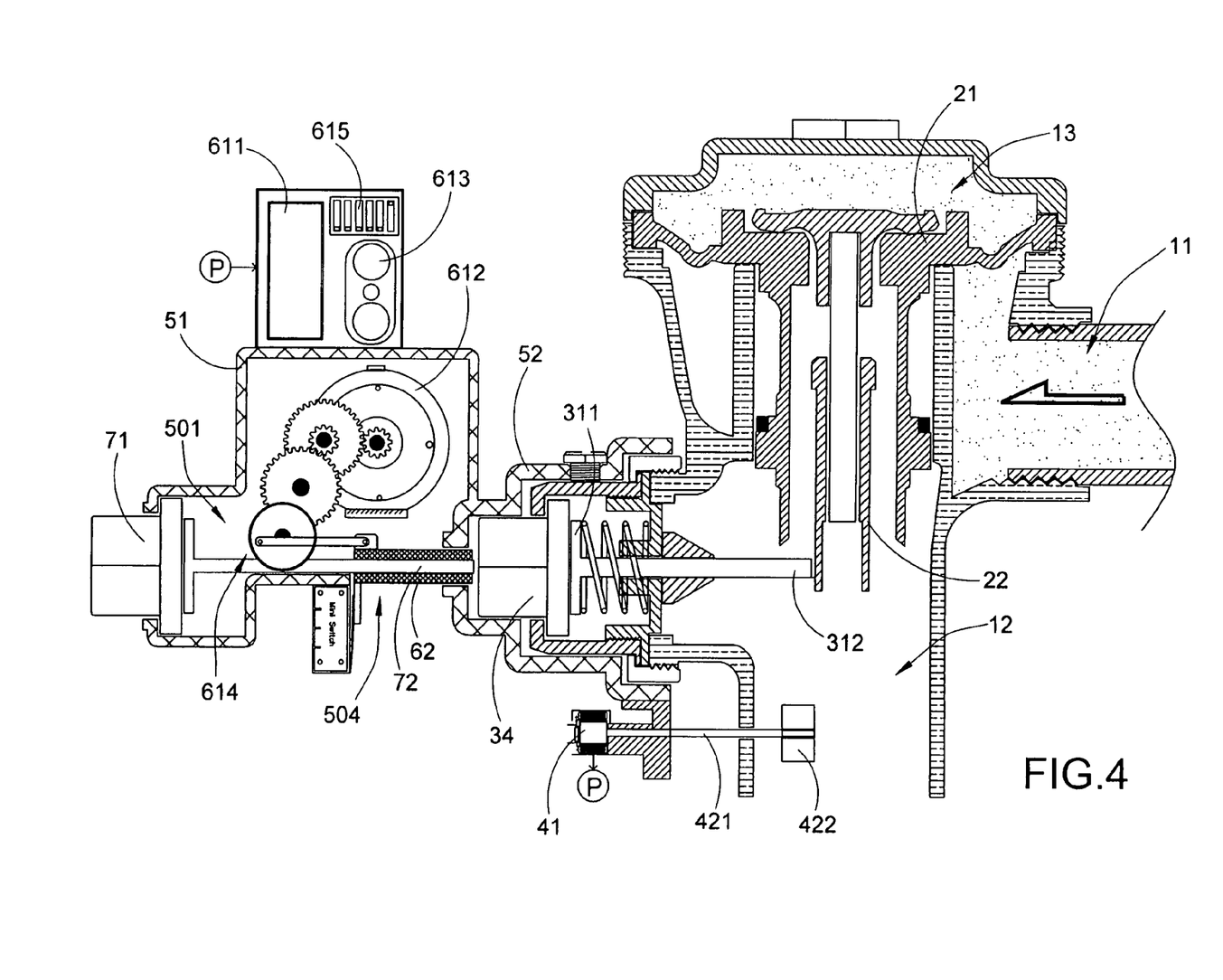
FIG. 4 illustrates the driving mechanism incorporating with an alternative mode of the button-type flush apparatus according to the above first preferred embodiment of the present invention.
Figure 5:
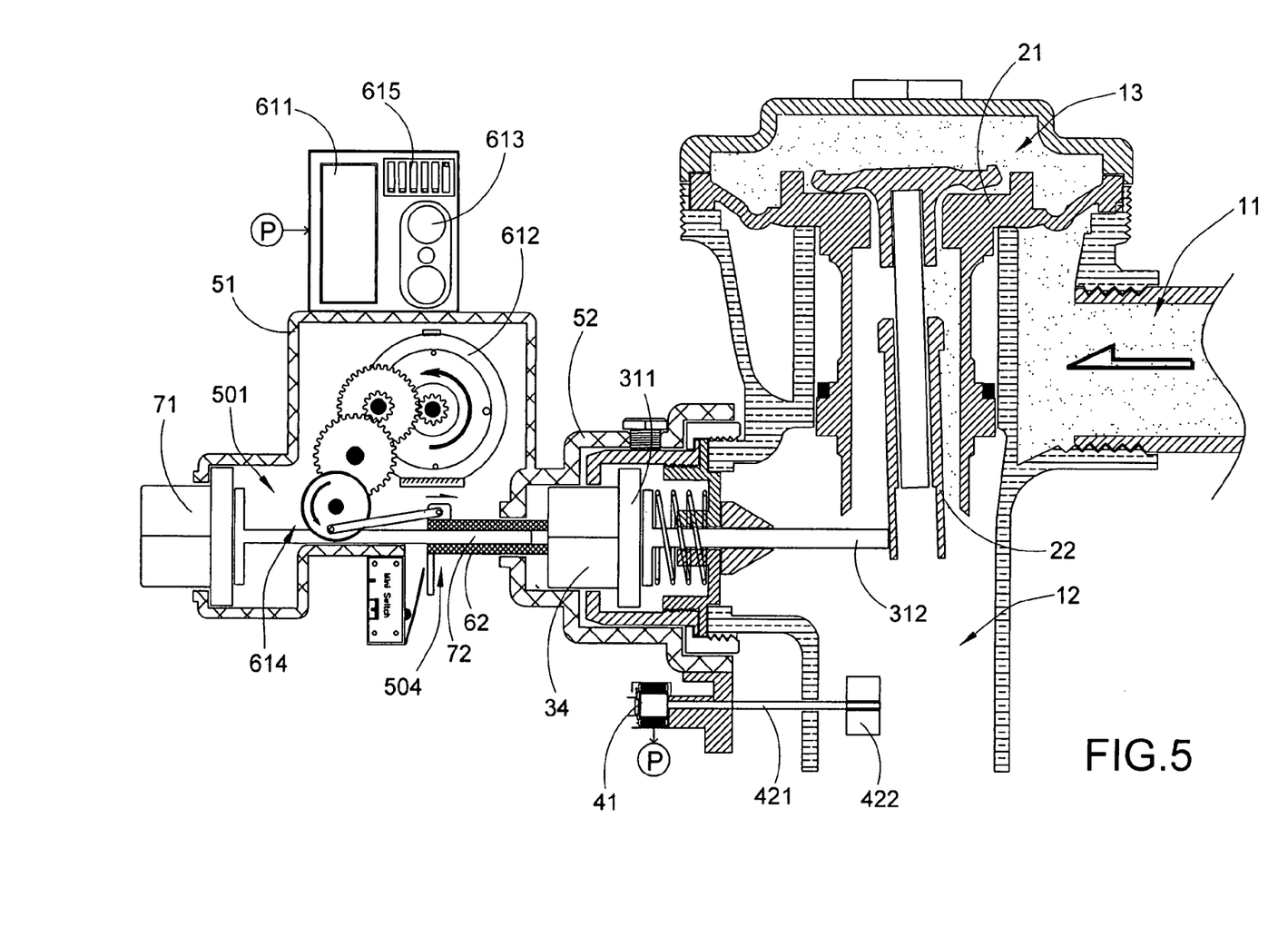
FIG. 5 illustrates the automatic plunger arm being actuated to move the diaphragm member of the alternative flush apparatus to its unsealed position according to the above first preferred embodiment of the present invention.
Figure 6:
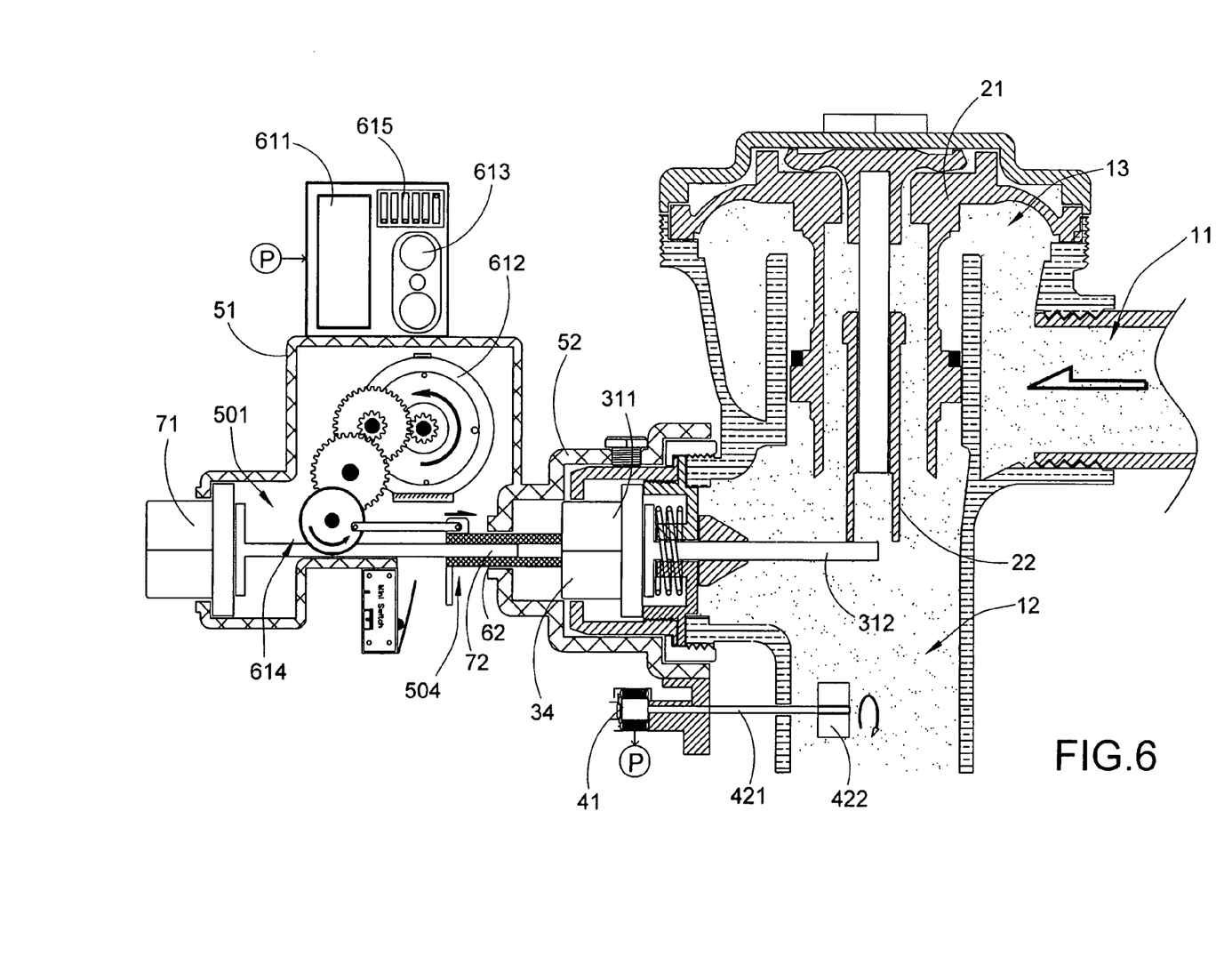
FIG. 6 illustrates the diaphragm member of the alternative flush apparatus returning back to the sealed position according to the above first preferred embodiment of the present invention.

FIGS. 4 to 6 illustrates alternative mode of the driving mechanism incorporating with the button-type conventional manual flush apparatus. As it is mentioned above, the handle type conventional manual flush apparatus is that the manual handle is actuated to push the pushing platform 311 at the pushing surface thereof towards diaphragm shaft 22 so as to move the diaphragm member 21 from the sealed position to the unsealed position. Accordingly, the button-type conventional manual flush apparatus is that operation device 30 further comprises a manual depressible button 34 coupling with the pushing platform 311 of the driving unit 31. Therefore, when the manual depressible button 34 is manually depressed, the pushing platform 311 is pushed by the manual depressible button 34 at the pushing surface thereof towards diaphragm shaft 22 so as to move the diaphragm member 21 from the sealed position to the unsealed position.

The driving mechanism of the present invention is adapted to incorporate with both the handle type conventional manual flush apparatus, as shown in FIGS. 1 to 3, and the button-type conventional manual flush apparatus, as shown in FIGS. 4 to 6. As shown in FIG. 4, the automated plunger arm 62 and the manual plunger arm 72 are slidably extended to the manual depressible button 34. Therefore, for manual operation, the manual plunger arm 72 is actuated to push at the manual depressible button 34. For automatic operation, the automated plunger arm 62 is actuated to push at the manual depressible button 34. In other words, both the manual and automatic operations for the handle type conventional manual flush apparatus are the same as the manual and automatic operations for the button-type conventional manual flush apparatus.

It is worth to mention that the operator must replace the manual handle from the handle type conventional manual flush apparatus in order to install the driving mechanism of the present invention. For the button-type conventional manual flush apparatus, the operator does not require to replace any part of the button-type conventional manual flush apparatus, i.e. keeping the manual depressible button 34, in order to install the driving mechanism of the present invention.

Figure 8:
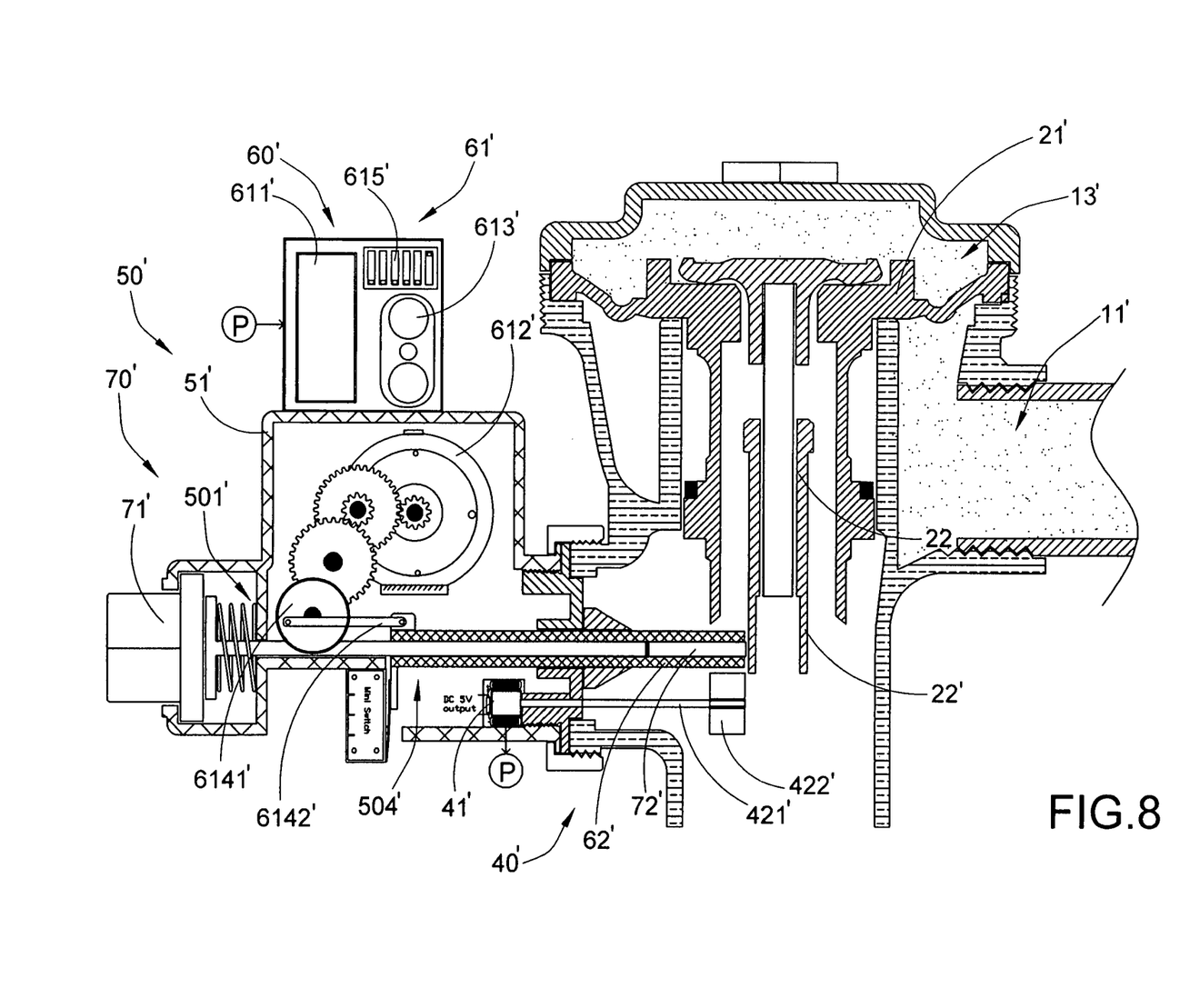
FIG. 8 is a sectional view of a flush apparatus with a driving mechanism according to a second preferred embodiment of the present invention.
Figure 9:
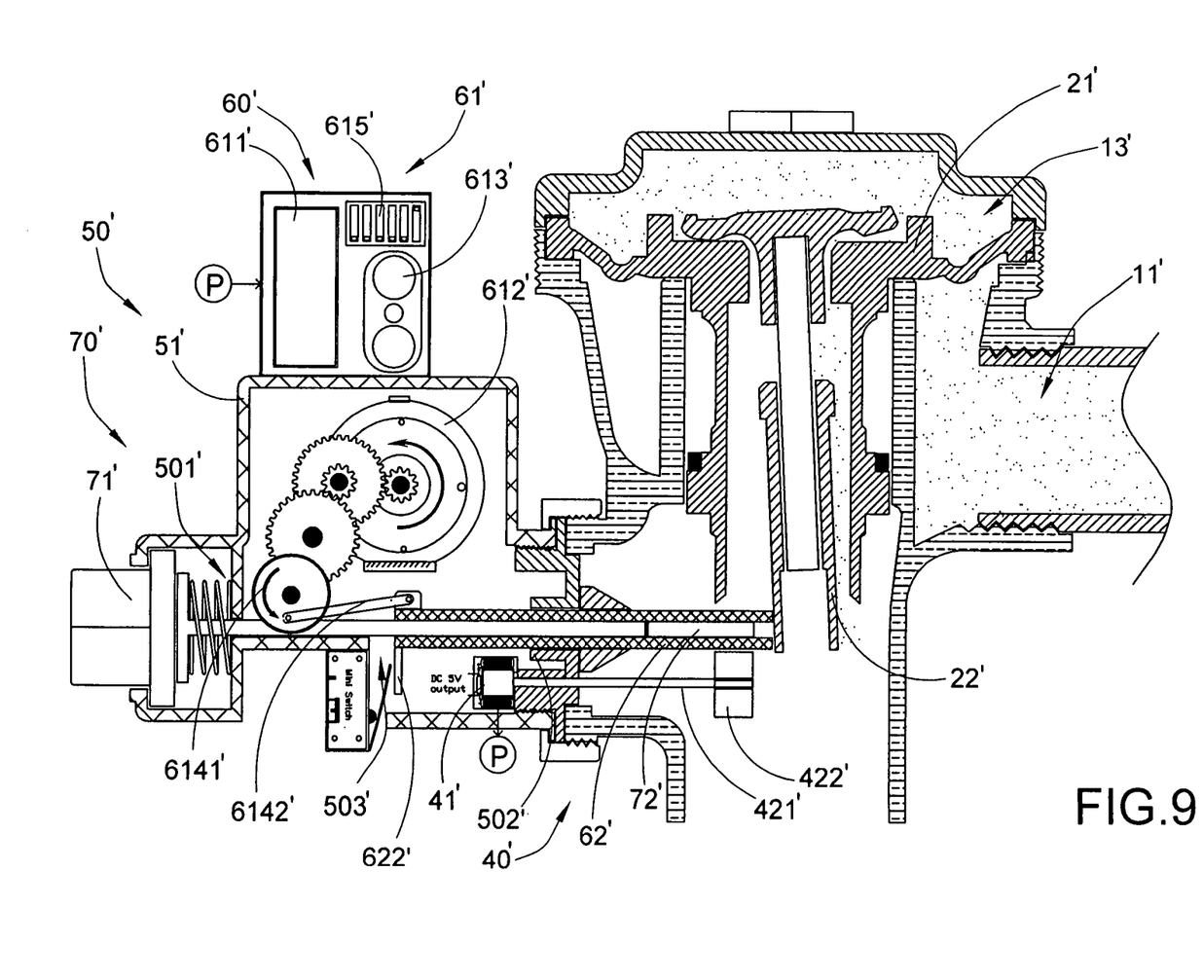
FIG. 9 is a sectional view of the flush apparatus according to the above second preferred embodiment of the present invention, illustrating the automatic plunger arm being actuated.
Figure 10:
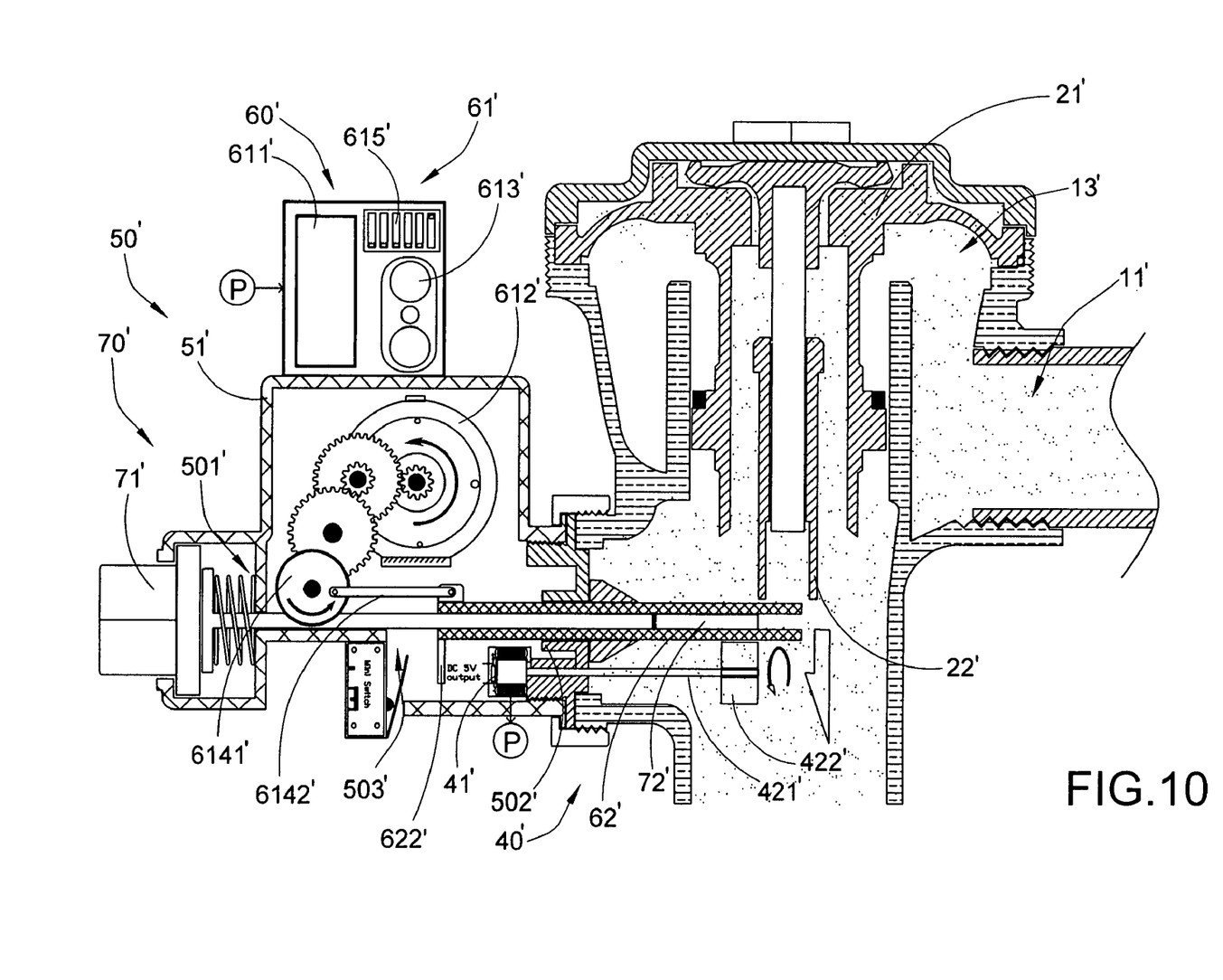
FIG. 10 is a sectional view of the flush apparatus according to the above second preferred embodiment of the present invention, illustrating the diaphragm member returning back to the sealed position.

As shown in FIGS. 8 to 10, a flush apparatus of a second preferred embodiment illustrates an alternative mode of the first embodiment, wherein the flush apparatus of the second preferred embodiment has the same configuration except the operation device 30 shown in the first embodiment.

According to the second embodiment, the driving mechanism comprises an actuation housing 50', an automated actuation unit 60', a manual actuation unit 70', and power charging arrangement 40'.

The actuation housing 50', having an actuation channel 501', is supported by the valve body 10. Accordingly, the actuation housing 50' is mounted at the valve body 10 at a position that the actuation housing 50' is positioned adjacent to the valve body 10. As shown in FIG. 8, the actuation housing 50' comprises a housing body 51' defining the actuation channel 501' at a bottom portion thereof and a tubular mounting element 52' mounting at said valve body to align the actuation channel 501' with the diaphragm shaft 22'. Accordingly, the actuation channel 501' is transversely extended to communicate with the bottom portion of the diaphragm shaft 22'.

The automated actuation unit 60' is received in the housing body 51' at a position above the actuation channel 501', wherein the automated actuation unit 60' comprises a motorized unit 61' received in the housing body 51' of the actuation housing 50' and an automated plunger arm 62' transversely extended along the actuation channel 501. When the motorized unit 61' is activated in responsive to a presence of a user, the automated plunger arm 62' is driven by the motorized unit 61' to move towards the diaphragm shaft 22', such that the diaphragm shaft 22' is pushed by the automated plunger arm 62' to move the diaphragm member 21' at the unsealed position, as shown in FIG. 9. Accordingly, the diaphragm member 21' is then moved back to its sealed position as shown in FIG. 10.

As shown in FIG. 8, the motorized unit 61' comprises a power source 611', a servo unit 612' electrically coupled with the power source 611', a sensor 613' controllably activating the servo unit 612' in responsive to a presence of the user, and a gear transmission unit 614' coupling the servo unit 612' with the automated plunger arm 62' to transmit a servo power from the servo unit 612' to a transverse force at the automated plunger arm 62' so as to drive the automated plunger arm 62' towards the diaphragm shaft 22.

According to the second embodiment, the power source 611' is a rechargeable battery supported in the housing body 51'. The servo unit 612' comprises an electric motor electrically connected to the power source 611'. The sensor 613' is an infrared sensor to detect the presence of the user by means of infrared signal. The gear transmission unit 614' comprises a gear set 6141' coupling with an output of the servo unit 612' and a driving arm 6142' driving the automated plunger arm 62' to laterally move in a reciprocating manner.

A CPU 615' is operatively connected to the sensor 613' to receive the signal therefrom, wherein the servo unit 612' is controlled by the CPU 615' such that once the CPU 615 receives the signal from the sensor 613', the CPU 615' will activate the servo unit 612' to drive the automatic plunger arm 62' for completing the automatic operation. It is worth to mention that the CPU 615' can be programmed to the time period of the presence of the user via the sensor 613' and to control the flush volume of the water via the automated actuation unit 60' by means of the time period of the opening of the diaphragm member 21' at the unsealed position The automated plunger arm 62' comprises a sliding stopper 622' blocked by a first stopper 502' of the housing body 51' to stop the further forward movement of the automated plunger arm 62' and blocked by a second stopper 503' of the housing body 51' to ensure the automated plunger arm 62' returning back to its original position. Accordingly, the housing body 51' has a guiding slot 504' provided at a bottom wall of the actuation channel 501', wherein the sliding stopper 622' is downwardly extended from the automated plunger arm 62' to slidably engage with the guiding slot 504'. The two ends of the guiding slot 504' form the first and second stoppers 502', 503' respectively, such that the traveling distance of the automated plunger arm 62' is limited by the length of the guiding slot 502' between the two ends thereof.

In other words, the automated actuation unit 60' of the second embodiment has the same configuration of the first embodiment, except that the automated plunger arm 62' of the second embodiment is extended to the diaphragm shaft 22' while the automated plunger arm 62 of the first embodiment is extended to the pushing platform 311.

The manual actuation unit 70' is received in the housing body 51' of the actuation housing 50'. The manual actuation unit 70' comprises a push button 71' movably mounted at the housing body 51' of the actuation housing 50' and a manual plunger arm 72' transversely extended along the actuation channel 501' from the push button 71' towards the diaphragm shaft 22'. When the push button 71' is manually pressed, the diaphragm shaft 22' is pushed by the manual plunger arm 72' to move the diaphragm member 21' at the unsealed position.

The push button 71' is extended to align with the diaphragm member 21 through the actuation channel 501'. The manual plunger arm 72' has an enlarged pressing end extended to bias against the push button 71' and an opposed pusher end extended towards the diaphragm shaft 22 through the actuation channel 501' in such a manner that when the push button 71' is manually pressed, the manual plunger arm 72' is directly pushed towards the diaphragm shaft 22'. The automated plunger arm 62' has a hollow structure defining a sliding channel 621' that the manual plunger arm 72' is slidably extended through the sliding channel 621'.

Therefore, the manual actuation unit 70' of the second embodiment has the same configuration of the first embodiment, except that the manual plunger arm 72' of the second embodiment is extended to the diaphragm shaft 22' while the manual plunger arm 72 of the first embodiment is extended to the pushing platform 311.

As shown in FIG. 8, the mounting element 52' having a ring shape defines two mounting openings to mount at the valve body 10' and the actuation housing 50' respectively to align the actuation channel 501'.

The power charging arrangement 40' of the second embodiment, having the same configuration of the first embodiment, comprises an electrical generator 41' operatively linked to the power source 611' and a propeller unit 42' extended from the electrical generator 41' to the water outlet 12' of the valve body 10 in such a manner that when the propeller unit 42' is driven to rotate in responsive to a flush of water coming out at the water outlet 12', the electrical generator 41' is actuated to charge the power source 611'. Accordingly, the power charging arrangement 40' can be an integrated device internally built-in with the housing body 51'.

The electrical generator 41' is an alternator or a DC generator. The propeller unit 42' comprises a propeller shaft 421' transversely extended along the actuation channel 501' and a propeller blade 422' coupled at a free end of the propeller shaft 421' at the water outlet 12' such that the propeller blade 422' is driven to be rotated in responsive to a flush of water so as to transmit a rotational power to the electrical generator 41' through the propeller shaft 421'.

It is worth to mention that the power charging arrangement 40, 40' can be incorporated with any conventional automated flush apparatus having a rechargeable power supply. Therefore, the user does not require frequently replacing the power supply or running any electrical cable to the power supply in order to installation the conventional automated flush apparatus.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. A flush apparatus, comprising:

a valve body having a water inlet and a water outlet;

a water valve comprising a diaphragm member sealing between said water inlet and said water outlet, and a diaphragm shaft extended from said diaphragm member to move said diaphragm member between a sealed position and an unsealed position;

an operation device comprising a driving unit and a retention ring coupled with said valve body, wherein said driving unit comprises a pushing platform movably disposed in said retention ring and a plunger pin extended from said pushing platform towards said diaphragm shaft; and a driving mechanism, which comprises:

an actuation housing having an actuation channel coupling with said retention ring;

a manual actuation unit which comprises a push button movably mounted at said actuation housing and a manual plunger arm transversely extended along said actuation channel from said push button towards said pushing platform, wherein when said push button is manually pressed, said pushing platform is pushed by said manual plunger arm to move said diaphragm member at said unsealed position; and an automated actuation unit which comprises a motorized unit received in said actuation housing and an automated plunger arm transversely extended along said actuation channel, wherein when said motorized unit is activated in responsive to a presence of a user, said automated plunger arm is driven by said motorized unit to move towards said pushing platform, such that said pushing platform is pushed by said automated plunger arm to move said diaphragm member at said unsealed position.

2. The flush apparatus, as recited in claim 1, wherein said motorized unit comprises a power source, a servo unit electrically coupled with said power source, a sensor controllably activating said servo unit in responsive to a presence of said user, and a gear transmission unit coupling said servo unit with said automated plunger arm to transmit a servo power from said servo unit to a transverse force at said automated plunger arm so as to drive said automated plunger arm towards said pushing platform.

3. The flush apparatus, as recited in claim 2, wherein said gear transmission unit comprises a gear set coupling with an output of said servo unit and a driving arm having one end rotatably coupling with said gear set and an opposed end pivotally coupling with said automated plunger arm in such a manner that when said servo unit is activated, said automated plunger arm is driven to laterally move in a reciprocating manner.

4. The flush apparatus, as recited in claim 3, wherein said automated plunger arm has a hollow structure defining a sliding channel that said manual plunger arm is slidably extended through said sliding channel.

5. The flush apparatus, as recited in claim 4, wherein said manual plunger arm has an enlarged pressing end extended to bias against said push button and an opposed pusher end extended towards said pushing platform through said actuation channel in such a manner that when said push button is manually pressed, said manual plunger arm is directly pushed towards said pushing platform.

6. The flush apparatus, as recited in claim 5, wherein said actuation housing comprises a housing body defining said actuation channel at a bottom portion thereof and receiving said manual and automated actuation units above said actuation channel, and a tubular mounting ring encirclingly mounting at said retention ring to align said actuation channel with said pushing platform.

7. The flush apparatus, as recited in claim 6, wherein said push button is aligned with said pushing platform such that when said push button is manually pressed, said pushing platform is directly pushed in a lateral direction through said manual plunger arm.

8. The flush apparatus, as recited in claim 4, wherein said actuation housing comprises a housing body defining said actuation channel at a bottom portion thereof and receiving said manual and automated actuation units above said actuation channel, and a tubular mounting ring encirclingly mounting at said retention ring to align said actuation channel with said pushing platform.

9. The flush apparatus, as recited in claim 4, wherein said push button is aligned with said pushing platform such that when said push button is manually pressed, said pushing platform is directly pushed in a lateral direction through said manual plunger arm.

10. The flush apparatus, as recited in claim 3, wherein said manual plunger arm has an enlarged pressing end extended to bias against said push button and an opposed pusher end extended towards said pushing platform through said actuation channel in such a manner that when said push button is manually pressed, said manual plunger arm is directly pushed towards said pushing platform.

11. The flush apparatus, as recited in claim 1, wherein said automated plunger arm has a hollow structure defining a sliding channel that said manual plunger arm is slidably extended through said sliding channel.

12. The flush apparatus, as recited in claim 1, wherein said manual plunger arm has an enlarged pressing end extended to bias against said push button and an opposed pusher end extended towards said pushing platform through said actuation channel in such a manner that when said push button is manually pressed, said manual plunger arm is directly pushed towards said pushing platform.

13. The flush apparatus, as recited in claim 1, wherein said actuation housing comprises a housing body defining said actuation channel at a bottom portion thereof and receiving said manual and automated actuation units above said actuation channel, and a tubular mounting ring encirclingly mounting at said retention ring to align said actuation channel with said pushing platform.

14. The flush apparatus, as recited in claim 1, wherein said push button is aligned with said pushing platform such that when said push button is manually pressed, said pushing platform is directly pushed in a lateral direction through said manual plunger arm.

15. A flush apparatus, comprising:
a valve body having a water inlet and a water outlet;
a water valve comprising a diaphragm member sealing between said water inlet and said water outlet, and a diaphragm shaft extended from said diaphragm member to move said diaphragm member between a sealed position and an unsealed position; and
a driving mechanism, which comprises:
an actuation housing, having an actuation channel, supported by said valve body;
a manual actuation unit which comprises a push button movably mounted at said actuation housing and a manual plunger arm transversely extended along said actuation channel from said push button towards said diaphragm shaft, wherein when said push button is manually pressed, said diaphragm shaft is pushed by said manual plunger arm to move said diaphragm member at said unsealed position; and
an automated actuation unit which comprises a motorized unit received in said actuation housing and an automated plunger arm transversely extended along said actuation channel, wherein when said motorized unit is activated in responsive to a presence of a user, said automated plunger arm is driven by said motorized unit to move towards said diaphragm shaft, such that said diaphragm shaft is pushed by said automated plunger arm to move said diaphragm member at said unsealed position.

16. The flush apparatus, as recited in claim 15, wherein said motorized unit comprises a power source, a servo unit electrically coupled with said power source, a sensor controllably activating said servo unit in responsive to a presence of said user, and a gear transmission unit coupling said servo unit with said automated plunger arm to transmit a servo power from said servo unit to a transverse force at said automated plunger arm so as to drive said automated plunger arm towards said diaphragm shaft.

17. The flush apparatus, as recited in claim 16, wherein said gear transmission unit comprises a gear set coupling with an output of said servo unit and a driving arm having one end rotatably coupling with said gear set and an opposed end pivotally coupling with said automated plunger arm in such a manner that when said servo unit is activated, said automated plunger arm is driven to laterally move in a reciprocating manner.

18. The flush apparatus, as recited in claim 17, wherein said automated plunger arm has a hollow structure defining a sliding channel that said manual plunger arm is slidably extended through said sliding channel.

19. The flush apparatus, as recited in claim 18, wherein said manual plunger arm has an enlarged pressing end extended to bias against said push button and an opposed pusher end extended towards said diaphragm shaft through said actuation channel in such a manner that when said push button is manually pressed, said manual plunger arm is directly pushed towards said diaphragm shaft.

20. The flush apparatus, as recited in claim 19, wherein said actuation housing comprises a housing body defining said actuation channel at a bottom portion thereof and receiving said manual and automated actuation units above said actuation channel, and a tubular mounting element mounting at said valve body to align said actuation channel with said diaphragm shaft.

21. The flush apparatus, as recited in claim 15, wherein said automated plunger arm has a hollow structure defining a sliding channel that said manual plunger arm is slidably extended through said sliding channel.

22. The flush apparatus, as recited in claim 15, wherein said manual plunger arm has an enlarged pressing end extended to bias against said push button and an opposed pusher end extended towards said diaphragm shaft through said actuation channel in such a manner that when said push button is manually pressed, said manual plunger arm is directly pushed towards said diaphragm shaft.

23. The flush apparatus, as recited in claim 15, wherein said actuation housing comprises a housing body defining said actuation channel at a bottom portion thereof and receiving said manual and automated actuation units above said actuation channel, and a tubular mounting element mounting at said valve body to align said actuation channel with said diaphragm shaft.

24. A flush apparatus, comprising:
a valve body having a water inlet and a water outlet;
a water valve comprising a diaphragm member sealing between said water inlet and said water outlet, and a diaphragm shaft extended from said diaphragm member to move said diaphragm member between a sealed position and an unsealed position; and
a driving mechanism, which comprises:
an actuation housing having an actuation channel, supported by said valve body;
an automated actuation unit which comprises a motorized unit comprising a power source received in said actuation housing and an automated plunger arm transversely extended along said actuation channel, wherein when said motorized unit is activated in responsive to a presence of a user, said automated plunger arm is driven by said motorized unit to move towards said diaphragm member, such that said diaphragm member is pushed via said automated plunger arm to move said diaphragm member at said unsealed position;
a power charging arrangement which comprises an electrical generator operatively linked to said power source and a propeller unit extended from said electrical generator to said water outlet of said valve body in such a manner that when said propeller unit is driven to rotate in responsive to a flush of water coming out at said water outlet, said electrical generator is actuated to charge said power source; and
a manual actuation unit which comprises a push button movably mounted at said actuation housing and a manual plunger arm transversely extended along said actuation channel from said push button towards said diaphragm shaft, wherein when said push button is manually pressed, said diaphragm shaft is pushed by said manual plunger arm to move said diaphragm member at said unsealed position.

25. A flush apparatus, comprising:
a valve body having a water inlet and a water outlet;
a water valve comprising a diaphragm member sealing between said water inlet and said water outlet, and a diaphragm shaft extended from said diaphragm member to move said diaphragm member between a sealed position and an unsealed position; and
a driving mechanism, which comprises:
an actuation housing having an actuation channel, supported by said valve body;
an automated actuation unit which comprises a motorized unit comprising a power source received in said actuation housing and an automated plunger arm transversely extended along said actuation channel, wherein when said motorized unit is activated in responsive to a presence of a user, said automated plunger arm is driven by said motorized unit to move towards said diaphragm member, such that said diaphragm member is pushed via said automated plunger arm to move said diaphragm member at said unsealed position, wherein said motorized unit further comprises a servo unit electrically coupled with said power source, a sensor controllably activating said servo unit in responsive to a presence of said user, and a gear transmission unit coupling said servo unit with said automated plunger arm to transmit a servo power from said servo unit to a transverse force at said automated plunger arm so as to drive said automated plunger arm towards said diaphragm shaft;
a power charging arrangement which comprises an electrical generator operatively linked to said power source and a propeller unit extended from said electrical generator to said water outlet of said valve body in such a manner that when said propeller unit is driven to rotate in responsive to a flush of water coming out at said water outlet, said electrical generator is actuated to charge said power source, wherein said propeller unit comprises a propeller shaft transversely extended along said actuation channel and a propeller blade coupled at a free end of said propeller shaft at said water outlet such that said propeller blade is driven to be rotated in responsive to a flush of water so as to transmit a rotational power to said electrical generator through said propeller shaft; and
a manual actuation unit which comprises a push button movably mounted at said actuation housing and a manual plunger arm transversely extended along said actuation channel from said push button towards said diaphragm shaft, wherein when said push button is manually pressed, said diaphragm shaft is pushed by said manual plunger arm to move said diaphragm member at said unsealed position.

26. The flush apparatus, as recited in claim 25, further comprising a retention ring coupled said actuation housing with said valve body and a driving unit which comprises a pushing platform movably disposed in said retention ring and a plunger pin extended from said pushing platform towards said diaphragm shaft, wherein said manual and automated plunger arms are extended towards said pushing platform in such a manner that when one of said manual and automated plunger arms driven to laterally move, said pushing platform is pushed to move said diaphragm member at said unsealed position.

27. The flush apparatus, as recited in claim 26, wherein said automated plunger arm has a hollow structure defining a sliding channel that said manual plunger arm is slidably extended through said sliding channel.

28. The flush apparatus, as recited in claim 27, wherein said propeller shaft is extended parallel to each of said manual and automated plunger arms along said actuation channel.

29. The flush apparatus, as recited in claim 25, wherein said automated plunger arm has a hollow structure defining a sliding channel that said manual plunger arm is slidably extended through said sliding channel.

30. The flush apparatus, as recited in claim 25, wherein said propeller shaft is extended parallel to each of said manual and automated plunger arms along said actuation channel.

* * * * *